(12) United States Patent
Habimana et al.

(10) Patent No.: US 9,527,988 B2
(45) Date of Patent: Dec. 27, 2016

(54) PRODUCTION OF BLEND OF POLYOLEFIN AND ORGANOPOLYSILOXANE

(71) Applicants: Multibase SA, Saint Laurent Du Pont (FR); Multibase Inc., Copley, OH (US); Dow Corning Corporation, Midland, MI (US)

(72) Inventors: Jean De La Croix Habimana, Maurage (BE); Ted Hays, Akron, OH (US); Patrick Prele, Cognin (FR)

(73) Assignees: Multibase SA (FR); Multibase Inc., Copley, OH (US); Dow Corning Corporation, Midland, MI (US)

( * ) Notice: Subject to any disclaimer, the term of this patent is extended or adjusted under 35 U.S.C. 154(b) by 0 days.

(21) Appl. No.: 14/429,004

(22) PCT Filed: Sep. 19, 2013

(86) PCT No.: PCT/EP2013/069482
§ 371 (c)(1),
(2) Date: Mar. 18, 2015

(87) PCT Pub. No.: WO2014/044759
PCT Pub. Date: Mar. 27, 2014

(65) Prior Publication Data
US 2015/0225557 A1    Aug. 13, 2015

(30) Foreign Application Priority Data
Sep. 19, 2012 (EP) .................................... 12306135

(51) Int. Cl.
*C08L 23/12* (2006.01)
*C08J 3/00* (2006.01)
*C08K 5/134* (2006.01)

(52) U.S. Cl.
CPC ............... *C08L 23/12* (2013.01); *C08J 3/005* (2013.01); *C08K 5/1345* (2013.01); *C08L 2207/04* (2013.01)

(58) Field of Classification Search
CPC ......... C08L 23/12; C08L 83/04; C08K 5/1345
See application file for complete search history.

(56) References Cited

U.S. PATENT DOCUMENTS

| | | | | |
|---|---|---|---|---|
| 4,179,432 A * | 12/1979 | Molt | ........................ | C08K 5/58 524/178 |
| 4,196,731 A | 4/1980 | Laurin et al. | | |
| 5,844,031 A | 12/1998 | Chen et al. | | |
| 2003/0212159 A1 | 11/2003 | Martinez et al. | | |
| 2010/0222474 A1* | 9/2010 | Irie | ......................... | C08L 23/02 524/106 |
| 2011/0165416 A1* | 7/2011 | Kawabe | ................... | C08L 77/02 428/343 |
| 2015/0338754 A1* | 11/2015 | Azuma | ................... | G03G 5/047 430/58.5 |

FOREIGN PATENT DOCUMENTS

| | | | |
|---|---|---|---|
| CN | 1428370 A | | 7/2003 |
| CN | 101570611 A | | 11/2009 |
| CN | 102153831 A | | 8/2011 |
| EP | 2 669 329 | * | 12/2013 |
| JP | 2001-335691 A | | 12/2001 |
| JP | 2001-342359 A | | 12/2001 |
| WO | WO2011083043 A1 | | 7/2011 |

OTHER PUBLICATIONS

Freeman (Silicones, Published for The Plastics Institute, ILIFFE Book Ltd., 1962) p. 27.*
CN 101 070 411 machine translation (2007).*
PCT/EP2013/069482 International Search Report dated Mar. 12, 2014, 3 pages.
'Plastics Additives Handbook' 6th Edition by Hanser Publishers 2009, Authors: Hans 20 Zweifel; Ralph D. Maier, Michael Schiller, at pp. 10-19.
English language abstract and machine assisted English translation for JP2001-335691 extracted from http://www4.ipdl.inpit.go.jp/ database on Mar. 9, 2015, 11 pages.

(Continued)

Primary Examiner — Kuo-Liang Peng
(74) Attorney, Agent, or Firm — Warner Norcross & Judd LLP

(57) ABSTRACT

A process for the production of a polymer composition is disclosed. The polymer composition comprises an organopolysiloxane dispersed in a thermoplastic organic polymer liable to thermo-radical degradation or cross-linking when subjected to a high compounding energy at a temperature above its melting point. In a first step (I), a thermoplastic organic polymer and an organopolysiloxane are mixed at a temperature at which both the thermoplastic organic polymer and the organopolysiloxane are in liquid phases to form a masterbatch. In a second step (II), the masterbatch is mixed with further thermoplastic organic polymer to form a polymer composition having a lower concentration of organopolysiloxane than that in the masterbatch. In the first step (I), the thermoplastic organic polymer and the organopolysiloxane are mixed in the presence of an additive capable of inhibiting the thermo-radical degradation or cross-linking of the thermoplastic organic polymer. The organopolysiloxane of the masterbatch remains stable during processing.

19 Claims, No Drawings

(56) References Cited

OTHER PUBLICATIONS

English language abstract and machine assisted English translation for JP2001-342359 extracted from http://www4.ipdl.inpit.go.jp/ database on Mar. 9, 2015, 16 pages.

English language abstract and machine assisted English translation for CN1428370(A) extracted from espacenet.com database on Mar. 10, 2015, 11 pages.

English language abstract and machine assisted English translation for CN102153831(A) extracted from espacenet.com database on Mar. 10, 2015, 19 pages.

English language abstract and machine-assisted English translation for CN101570611 A extracted from http://worldwide.espacenet.com on Apr. 19, 2016, 10 pages.

* cited by examiner

PRODUCTION OF BLEND OF POLYOLEFIN AND ORGANOPOLYSILOXANE

CROSS-REFERENCE TO RELATED APPLICATIONS

This application is the National Stage of International Patent Application No. PCT/EP2013/069482, filed on Sep. 19, 2013, which claims priority to and all advantages of European Patent Application No. 12306135.0, filed on Sep. 19, 2012, the content of which is hereby incorporated by reference.

BACKGROUND OF THE INVENTION

The present invention relates to the production of a polymer blend by mixing a thermoplastic organic polymer and an organopolysiloxane at a temperature above the melting point of the thermoplastic organic polymer. Such a melt blending process can be used to produce a polymer blend in which the organopolysiloxane is dispersed in a matrix of the thermoplastic organic polymer. The polymer blend is useful particularly as a masterbatch which can be mixed with further thermoplastic organic polymer to produce an organic polymer composition containing a minor proportion of organopolysiloxane. A masterbatch is usually formed by adding an organopolysiloxane in liquid form to a thermoplastic organic polymer in liquid form, intimately mixing the components in liquid phase, and cooling the mixture to form the masterbatch in solid form. The masterbatch is often in the form of handy powder or pellets.

Thermoplastic organic polymers can be processed for example by compounding or by moulding, for example extrusion or injection moulding, to produce wires, cables, films, fibres or moulded structures such as interior automobile parts. Dispersing a polysiloxane composition throughout the structure of a thermoplastic organic polymer by a masterbatch technique has been proposed for example in U.S. Pat. No. 5,844,031. The polysiloxane can improve the properties of the thermoplastic organic polymer, for example it can reduce its coefficient of friction, increase its hydrophobicity and/or increase its abrasion resistance, scratch resistance and wear resistance.

CN1428370 describes a composition including (wt %) 85-95% of ultrahigh molecular weight polyethylene, 3-15% of polysiloxane and 0.2-2% of antioxidant. CN102153831 describes an acrylonitrile-chlorinated polyethylene-styrene resin composite comprising acrylonitrile-chlorinated polyethylene-styrene grafting powder, styrene acrylonitrile resin, weather-resistance master grain, lubricating agent, antioxidant and heat stabilizer.

JP2001-335691 describes a resin composition containing a low molecular weight silicone resin having molecular weight of 1,000 to 50,000, a high molecular weight silicone resin having molecular weight of 200,000 to a million, and a higher fatty acid amide. JP 2001335691 describes a composition prepared by blending (A) a silicone resin with molecular weight 10,000-40,000 (B) a silicone resin with molecular weight 300,000-500,000 (C) oleamide, (D) polyolefin resin e.g. low-density polyethylene resin and optional additives (e.g. antioxidant, flame retardant, pigment).

US2003/0212159 describes a foamable polymer composition that may contain one or more additives for example inorganic fillers, antioxidants, colorants, pigments, light stabilizers, optical whitening agents, acid scavengers, ultraviolet absorbers, plasticizers, processing aids, ignition resistant additives, viscosity modifiers, antistatic additives or extrusion aids.

To get full benefits of the silicone masterbatch, one needs to get a very fine, homogeneous dispersion of the organopolysiloxane in a matrix of the thermoplastic organic polymer to ensure a long shelf life of this composition made out of two incompatible polymers. This requires thorough mixing of the thermoplastic organic polymer and the organopolysiloxane under high shear at a temperature at which both the thermoplastic organic polymer and the organopolysiloxane are in liquid phases when forming the masterbatch. When organopolysiloxane dispersion is not well controlled, it results in inconsistent performances when the masterbatch is compounded into a thermoplastic organic polymer matrix. For example it may result in forming gels during extrusion, high variation in friction coefficients, delamination or organopolysiloxane transferring from one surface to another during film production. It may also result in low and variable scratch resistance properties when injection moulding plastic parts.

A siloxane or polysiloxane or organopolysiloxane or silicone is a silicon containing compound containing repeating Si—O—Si bonds. Such repeating Si—O—Si bonds form a polymeric chain. The organopolysiloxane has pendant groups which are chemical groups located on the Si atoms along the polymeric chain. The organopolysiloxane comprises terminal groups. A terminal group is a chemical group located on an Si atom which is at an end of the polymer chain.

An organopolysiloxane can be an organopolysiloxane comprising at least one of the following units: M unit (mono-functional), D unit (di-functional), T unit (tri-functional), Q unit (tetra-functional). A M unit has the formula $R_3SiO_{1/2}$ wherein R is a substituent, preferably an organic substituent and each R can be the same or different on a single Si atom. A D unit has the formula $R_2SiO_{2/2}$ wherein R is a substituent, preferably an organic substituent and each R can be the same or different on a single Si atom. A Q unit has the formula $SiO_{4/2}$. A T unit has the formula $RSiO_{3/2}$, wherein R is a substituent, preferably an organic substituent. Each substituent R can be selected for example from alkyl, aryl, alkenyl, acrylate, methacrylate and others. For example it can be an alkenyl group having 1 to 6 carbon atoms, for example a vinyl group or a hexenyl group.

A branched organopolysiloxane typically contains at least one T unit and/or at least one Q unit. A linear organopolysiloxane typically contains D units and optionally M units. A polymer is a compound containing repeating units which units typically form at least one polymeric chain. A polymer is called an organic polymer when the repeating units contain carbon atoms. An organic polymer is called a thermoplastic organic polymer when it becomes liquid when it is heated.

We have found that minor changes in the processing conditions used in the preparation of the masterbatch can affect the molecular structure of the organopolysiloxane. This can in turn affect the properties of a thermoplastic organic polymer composition into which the masterbatch is compounded. There is a need for a process in which the molecular structure of the organopolysiloxane is unchanged during masterbatch production, or is less sensitive to variations in processing conditions during masterbatch production.

BRIEF SUMMARY OF THE INVENTION

The present invention provides a process for the production of a polymer composition comprising an organopolysiloxane dispersed in a thermoplastic organic polymer liable to thermo-radical degradation or cross-linking when subjected to a high compounding energy at a temperature above its melting point, wherein in a first step (I) the thermoplastic organic polymer and the organopolysiloxane are mixed at a temperature at which both the thermoplastic organic polymer and the organopolysiloxane are in liquid phases to form a masterbatch, and in a second step (II) the masterbatch is mixed with further thermoplastic organic polymer to form a polymer composition having a lower concentration of organopolysiloxane than that in the masterbatch, is characterised in that in the first step (I) the thermoplastic organic polymer and the organopolysiloxane are mixed in the presence of an additive capable of inhibiting the thermo-radical degradation or cross-linking of the thermoplastic organic polymer.

The invention provides a process according for the production of a polymer composition comprising an organopolysiloxane dispersed in a thermoplastic organic polymer, wherein in a first step (I) the thermoplastic organic polymer and the organopolysiloxane are mixed at a temperature at which both the thermoplastic organic polymer and the organopolysiloxane are in liquid phases to form a masterbatch, and in a second step (II) the masterbatch is mixed with further thermoplastic organic polymer to form a polymer composition having a lower concentration of organopolysiloxane than that in the masterbatch, is characterised in that in the first step (I) the thermoplastic organic polymer and the organopolysiloxane are mixed in the presence of an additive capable of inhibiting thermo-radical degradation or cross-linking of the thermoplastic organic polymer.

A thermoplastic organic polymer is often liable to thermo-radical degradation or cross-linking when subjected to a high compounding energy at a temperature above its melting point.

A process according to another aspect of the present invention for the production of a polymer composition comprising 10 to 50 parts by weight of an organopolysiloxane dispersed in 90 to 50 parts by weight of a thermoplastic organic polymer liable wherein the thermoplastic organic polymer and the organopolysiloxane are mixed at a temperature at which both the thermoplastic organic polymer and the organopolysiloxane are in liquid phases, is characterised in that the thermoplastic organic polymer and the organopolysiloxane are mixed in the presence of an additive capable of inhibiting thermo-radical degradation or cross-linking of the thermoplastic organic polymer. A polymer composition comprising 10 to 50 parts by weight of an organopolysiloxane dispersed in 90 to 50 parts by weight of a thermoplastic organic polymer is generally useful as a masterbatch for mixing with further thermoplastic organic polymer.

DETAILED DESCRIPTION OF THE INVENTION

We have found according to the invention that the presence of an additive capable of inhibiting the thermo-radical degradation or cross-linking of the thermoplastic organic polymer may prevent the organopolysiloxane from change in molecular structure during processing to form a masterbatch. Organopolysiloxanes are not generally liable to thermo-radical degradation or cross-linking when subjected to shear at high temperature; known degradation reactions of organopolysiloxanes generally involve hydrolysis and/or siloxane condensation.

Preferably an organic polymer is a polymer in which carbon atoms form at least 50% of the atoms in the main chain of the polymer. Examples of thermoplastic organic polymers include polyolefins such as polypropylene, polyethylene and copolymers of propylene and/or ethylene, polyvinylchloride, polystyrene, acrylonitrile-butadiene-styrene copolymers, polyamides and polyamines, polyesters, acrylic polymers, acetals and polymers of fluorinated olefins. All of these thermoplastic organic polymers are to some extent liable to thermo-radical degradation or cross-linking when subjected to shear at a temperature above their melting point. The invention is particularly advantageous when the thermoplastic organic polymer is a polyolefin. Polypropylene is particularly liable to thermo-radical degradation when subjected to a high compounding energy at a temperature above its melting point. The polymer can be bi-axially oriented polypropylene (BOPP). Polyethylene is liable to thermo-radical cross-linking when subjected to a high compounding energy at a temperature above its melting point. The organic polymer is preferably polypropylene or polyethylene.

In some preferred embodiments, the thermoplastic organic polymer is a rubber, even if most rubbers do not have truly thermoplastic behaviour. A rubber is typically a diene elastomer. By a diene elastomer we mean a polymer having elastic properties at room temperature, mixing temperature or at the usage temperature, which can be polymerized from a diene monomer. Typically, a diene elastomer is a polymer containing at least one ene (carbon-carbon double bond, C=C) having a hydrogen atom on the alpha carbon next to the C=C bond. The diene elastomer can be a natural polymer such as natural rubber or can be a synthetic polymer derived at least in part from a diene.

The diene elastomer can be natural rubber. The diene elastomer can alternatively be a synthetic polymer which is a homopolymer or copolymer of a diene monomer (a monomer bearing two double carbon-carbon bonds, whether conjugated or not). Preferably the elastomer is an "essentially unsaturated" diene elastomer, which is a diene elastomer resulting at least in part from conjugated diene monomers, having a content of members or units of diene origin (conjugated dienes) which is greater than 15 mol %. More preferably it is a "highly unsaturated" diene elastomer having a content of units of diene origin (conjugated dienes) which is greater than 50 mol %. Diene elastomers such as butyl rubbers, copolymers of dienes and elastomers of alpha-olefins of the ethylene-propylene diene monomer (EPDM) type, which may be described as "essentially saturated" diene elastomers having a low (less than 15 mol %) content of units of diene origin, can alternatively be used but are less preferred.

The diene elastomer can for example be:
(a) any homopolymer obtained by polymerization of a conjugated diene monomer having 4 to 12 carbon atoms;
(b) any copolymer obtained by copolymerization of one or more dienes conjugated together or with one or more vinyl aromatic compounds having 8 to 20 carbon atoms;
(c) a ternary copolymer obtained by copolymerization of ethylene, of an [alpha]-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;

(d) a copolymer of isobutene and isoprene (butyl rubber), and also the halogenated, in particular chlorinated or brominated, versions of this type of copolymer.

Suitable conjugated dienes are, in particular, 1,3-butadiene, 2-methyl-1,3-butadiene, 2,3-di($C_1$-$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl-aromatic compounds are, for example, styrene, ortho-, meta- and para-methylstyrene, the commercial mixture "vinyltoluene", para-tert.-butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl aromatic units. The elastomers may have any microstructure, which is a function of the polymerization conditions used, in particular of the presence or absence of a modifying and/or randomizing agent and the quantities of modifying and/or randomizing agent used. The elastomers may for example be block, statistical, sequential or microsequential elastomers, and may be prepared in dispersion or in solution; they may be coupled and/or starred or alternatively functionalized with a coupling and/or starring or functionalizing agent. Examples of preferred block copolymers are styrene-butadiene-styrene (SBS) block copolymers and styrene-ethylene/butadiene-styrene (SEBS) block copolymers.

Preferred are polybutadienes, and in particular those having a content of 1,2-units between 4% and 80%, or those having a content of cis-1,4 of more than 80%, polyisoprenes, butadiene-styrene copolymers, and in particular those having a styrene content of between 5% and 50% by weight and, more particularly, between 20% and 40%, a content of 1,2-bonds of the butadiene fraction of between 4% and 65%, and a content of trans-1,4 bonds of between 20% and 80%, butadiene-isoprene copolymers and in particular those having an isoprene content of between 5% and 90% by weight. In the case of butadiene-styrene-isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2-plus 3,4-units of the isoprene fraction of between 5% and 70%, and a content of trans-1,4 units of the isoprene fraction of between 10% and 50%.

In one preferred embodiment of the present invention, the thermoplastic organic polymer is polypropylene of relatively high molecular weight having a melt flow index (MFI) below 20. The MFI of the polypropylene can for example be in the range 5 to 15. The low MFI polypropylene requires high energy for processing or compounding, but compounding at high energy is also required to give thorough mixing of an organopolysiloxane with any polyolefin.

The organopolysiloxane can be a linear siloxane polymer such as a polydiorganosiloxane, or can be a branched organopolysiloxane, a cyclic organosiloxane polymer or a branched siloxane resin, or a mixture of two or more of these.

Preferably, the organopolysiloxane comprises a predominantly linear siloxane polymer. Such linear organopolysiloxane is substantially free of T units and from Q units. Such linear organopolysiloxane will comprise essentially or will be exclusively formed of D units and M units without T units and without Q units.

Preferably, the organopolysiloxane is different than a mixture of organopolysiloxane polymers of significantly different molecular weight range.

Preferably the composition is free of oleamide.

Preferably the organopolysiloxane comprises a predominantly linear siloxane polymer having a high molecular weight. Typically its degree of polymerization (DP) is greater than 4000. Such a high DP linear siloxane polymer is often called a 'silicone gum'. A silicone gum is typically a predominantly linear polydialkylsiloxane polymer for example a linear polydimethylsiloxane polymer of high viscosity. The viscosity of a silicone gum is preferably at least 600 000 mm2/s. The silicone gum can have at least one functional group, preferably at least two, in terminal position. The high DP linear siloxane polymer can for example have a DP in the range from 5000 up to 7000 or 10000. The high DP linear siloxane polymer can be used as the only organopolysiloxane or may be mixed with a branched organopolysiloxane, a cyclic organosiloxane polymer, a lower DP linear siloxane polymer and/or a branched siloxane resin. The high DP linear siloxane polymer preferably forms at least 50% by weight of any such organopolysiloxane mixture.

A branched organopolysiloxane can for example comprise polydiorganosiloxane moieties linked by branching units selected from $RSiO_{3/2}$ units and $SiO_{4/2}$ units, where R represents an organo group. A cyclic organosiloxane polymer can for example be a cyclic oligomer such as decamethylcyclopentasiloxane or octamethylcyclotetrasiloxane. A branched siloxane resin can for example be a silsesquioxane resin or a resin comprising $SiO_{4/2}$ units and $R_3SiO_{1/2}$ units, where R represents an organo group.

Preferably the silicone gum has high plasticity. A high plasticity is preferably defined as being at least 50, preferably at least 55, more preferably at least 60 mils. The plasticity is measured at room temperature (20, 23 or 25 C) using ASTM D926.

The organo groups in the organopolysiloxane are preferably methyl groups; the high DP linear siloxane polymer is preferably a polydimethylsiloxane. The organo groups can alternatively comprise ethyl or higher alkyl groups or can comprise phenyl groups.

We have found that the effect of the presence of the additive capable of inhibiting the thermo-radical degradation or cross-linking of the thermoplastic organic polymer during processing to form a masterbatch has a more marked effect on the organopolysiloxane than on the thermoplastic organic polymer. The additive capable of inhibiting the thermo-radical degradation or cross-linking of the thermoplastic organic polymer prevents a change in molecular structure of the organopolysiloxane which is noticeable in the properties of the final polymer composition formed by mixing the masterbatch with further thermoplastic organic polymer in second step (II). Whilst we believe that the initial effect of the additive is to inhibit thermo-radical degradation or cross-linking of the thermoplastic organic polymer during masterbatch production, such degradation or cross-linking of the thermoplastic organic polymer is usually not noticeable after the masterbatch has been mixed with further thermoplastic organic polymer in second step (II). It is not noticeable, for example, when polypropylene is compounded with a filler at a temperature above its melting point to form a masterbatch, and the masterbatch is then mixed with further thermoplastic organic polymer. However we believe that the thermo-radical degradation or cross-linking of the thermoplastic organic polymer may initiate a change in molecular structure of the organopolysiloxane. Thus a problem which is seen as a change in molecular structure of the organopolysiloxane is solved by use of an additive having its initial effect on the thermoplastic organic polymer.

The organopolysiloxane of the masterbatch according to the present invention is able to remain stable after the final polymer composition is formed. This can be observed by measuring the molecular weight of the organosiloxane before forming the masterbatch and after processing (i.e. after mixing the masterbatch within the thermoplastic organic polymer). The change in molecular weight for masterbatches according to the present invention is significantly lower than the change of molecular weight of the organopolysiloxane for masterbatches not containing the additive.

This is surprising especially for masterbatches containing organopolysiloxanes containing functional group(s) such as reactive functional group(s) which one can expect will undergo chemical modification by the mixing process. The presence of the additive appears to be able to prevent reactions occurring in the next stage process (step (II)) which can lead to different performance from application to application.

Preferably the organopolysiloxane comprises at least one functional group i.e. a group different than being formed exclusively of an alkyl group.

Such functional group is able to react for example through radical reaction. Preferably the organopolysiloxane comprises more than one functional group i.e. it contains functional groups.

A functional group may be in a terminal position in the organopolysiloxane. Alternatively, or in addition, it can be pendant along the chain. Preferably the functional group is in terminal position. Preferably, at least two terminal positions of the polymer are substituted by functional groups. When the organopolysiloxane is linear, it is preferred that both terminal units are substituted by functional groups.

The reactive group can be a chemical group containing one or more of the following functions:
 allyl for example vinyl,
 cyclic group containing at least one unsaturated C=C bond such as for example phenyl,
 acryloxy, acryl, methacryloxy, methacryl, epoxy, amine, carboxyl, hydroxy, mercapto, carbinol, ester, acyl,
Preferably the functional group(s) present in the organopolysiloxane is/are free of SiH containing groups. Preferably the functional group contains one or more of the following functions: vinyl, methacryloxy, and acryloxy.

The additive capable of inhibiting the thermo-radical degradation or cross-linking of the thermoplastic organic polymer is preferably an antioxidant.

Therefore the invention provides a process for the production of a polymer composition comprising an organopolysiloxane dispersed in a thermoplastic organic polymer, wherein in a first step (I) the thermoplastic organic polymer and the organopolysiloxane are mixed at a temperature at which both the thermoplastic organic polymer and the organopolysiloxane are in liquid phases to form a masterbatch, and in a second step (II) the masterbatch is mixed with further thermoplastic organic polymer to form a polymer composition having a lower concentration of organopolysiloxane than that in the masterbatch, characterised in that in the first step (I) the thermoplastic organic polymer and the organopolysiloxane are mixed in the presence of an antioxidant.

The additive capable of inhibiting the thermo-radical degradation or cross-linking of the thermoplastic organic polymer can be any of the types of antioxidants listed in section 1.5 of 'Plastics Additives Handbook' 6$^{th}$ Edition by Hanser Publishers 2009, Authors: Hans Zweifel; Ralph D. Maier, Michael Schiller, at pages 10-19. The additive capable of inhibiting the thermo-radical degradation or cross-linking of the thermoplastic organic polymer can for example be a H-donor, a hydroperoxide decomposer, an alkyl radical scavenger, a metal deactivator, or a multifunctional stabilizer as defined in 'Plastics Additives Handbook' or a combination of one or more of these stabilizers can be used.

Examples of H-donors include phenols, particularly sterically hindered phenolic antioxidants, and secondary aromatic amines. Examples of sterically hindered phenolic antioxidants include 2,6-di-(tert.butyl) phenol and esters thereof such as pentaerythritoltetrakis(3-(3,5-di-tert-butyl-4-hydroxyphenyl)propionate, which is available commercially under the trade mark 'Irganox 1010'.

Examples of hydroperoxide decomposers include organic compounds of trivalent phosphorus such as phosphites or phosphonites, and organic sulfur compounds such as organic sulfides, esters of 3,3-dithiopropionic acid, metal dialkyldithiocarbamate salts and metal dithiophosphate salts.

Examples of alkyl radical scavengers include hindered amine stabilisers such as 2,2,6,6-tetramethyl piperidine and derivatives thereof, N-hydroxyl amines, 3-arylbenzofuranone derivatives and acryloyl modified phenols.

Multifunctional stabilisers are those which combine in one molecule more than one function selected from H-donor, hydroperoxide decomposer, alkyl radical scavenger and metal deactivator functions. For example sterically hindered phenols with organic sulfide substituents act as both H-donor and hydroperoxide decomposer. Acryloyl modified phenols containing at least one tert.-butyl group ortho to the phenolic hydroxyl group act as both H-donor and alkyl radical scavenger. An example is 2-(2'-hydroxy-3'-tert.-butyl-5-methyl)α-methylbenzyl-4-methyl-6-tert.-butyl-phenyl acrylate. A metal deactivator, which forms a stable complex with metals such as copper, may contain sterically hindered phenol groups. An example is 3-(3',5'-di-tert.-butyl-4-hydroxy)phenylpropionamide.

The stabiliser additive capable of inhibiting the thermo-radical degradation or cross-linking of the thermoplastic organic polymer is preferably present at at least 0.1% by weight based on the combined weight of thermoplastic organic polymer and organopolysiloxane in the masterbatch. The stabiliser is generally present at up to 2% by weight, usually no more than 1% by weight. Levels of stabiliser greater than 2% can be used but are generally not necessary for stabilising the molecular structure of the organopolysiloxane.

The thermoplastic organic polymer and the organopolysiloxane are mixed to form a masterbatch at a temperature at which both the thermoplastic organic polymer and the organopolysiloxane are in liquid phases. Organopolysiloxanes, for example silicone gums, are usually liquid at ambient temperature and/or above ambient temperature. In a preferred procedure, the first step (I) of the process of the invention comprises the steps of (I)(a) first melting the thermoplastic organic polymer and (I)(b) mixing the molten thermoplastic organic polymer thus produced with the organopolysiloxane. Preferably in step (I)(a) the thermoplastic organic polymer is melted in the presence of the additive capable of inhibiting the thermo-radical degradation or cross-linking of the thermoplastic organic polymer. Alternatively the additive capable of inhibiting the thermo-radical degradation or cross-linking of the thermoplastic organic polymer can be added with the organopolysiloxane.

Preferably, the thermoplastic organic polymer of the masterbatch is of the same nature as the thermoplastic organic polymer matrix. In other preferred embodiments, the thermoplastic organic polymer of the masterbatch is different than the thermoplastic organic polymer of the matrix. Some compatibility between the polymers is then needed. Preferably, the masterbatch contains only the thermoplastic organic polymer, the organopolysiloxane and the additive. In other preferred embodiments, the masterbatch contains the thermoplastic organic polymer, an organopolysiloxane, an additive and further component(s).

One preferred apparatus for carrying out the first step (I) of the process of the invention is a twin screw extruder. The thermoplastic organic polymer can be melted in the first stage of the twin screw extruder, preferably in the presence of the additive capable of inhibiting the thermo-radical degradation or cross-linking. The organopolysiloxane can be added at a port in the extruder positioned so that the organopolysiloxane is added to molten thermoplastic organic polymer. The extrudate can for example be cooled and divided into pellets, which are a convenient form of masterbatch for mixing with further thermoplastic organic polymer in step (II).

The temperature at which the thermoplastic organic polymer and the organopolysiloxane are mixed in the first step (I) of the process of the invention is generally at or above the melting temperature of the thermoplastic organic polymer and below the temperature at which the thermoplastic organic polymer degrades (even without high energy compounding). For many thermoplastic organic polymers, including for example polypropylene and polyethylene, a temperature in the range 180° C. to 250° C. is a convenient and effective temperature for the first step (I) of the process of the invention, for example an extruder temperature in this range. Temperatures in the range 200° C. to 230° C. may be preferred.

Since organopolysiloxanes are incompatible with most thermoplastic organic polymers, a high compounding energy is required to give effective mixing, that is a high energy in the extruder or other mixing device per weight of polymer (thermoplastic organic polymer plus organopolysiloxane) mixed. The compounding energy preferably is high so in such a way that it is sufficient that the thermoplastic organic polymer and organopolysiloxane are mixed so that the average domain size of the organopolysiloxane phase dispersed in the polymer composition is from 1-10 μm. The high compounding energy giving a very fine, homogeneous dispersion of the organopolysiloxane phase is needed to get full benefits of the silicone masterbatch which is made out of two incompatible polymers. It is also necessary to get a high consistency from batch to batch, which is required for the end users (plastics compounders who mix the masterbatch with further thermoplastic organic polymer. When the silicone dispersion is not well controlled, it results in inconsistent performances when the masterbatch is compounded into a thermoplastic organic polymer matrix. For example it may result in forming gels during extrusion, high variation in friction coefficients, delamination or silicone transferring from one surface to another during film production. It may also result in low and variable scratch resistance properties when injection moulding plastic parts.

For a continuous mixing device such as an extruder, the compounding energy E=Torque T×N (speed rotation of the screw rpm)/Q (Output kg/h) (E=T·N/Q). The torque T is proportional to the power of the mixing device. For an electrically driven mixing device operating at a constant voltage, the power is also proportional to electric current I. In this case, a measure E' proportional to compounding energy which is E'=current (I in amps)×N (speed rotation of the screw in rpm)/Q (output Kg/h), (E'=A·N/Q) can be calculated. For a twin screw extruder operating at a 380 volt power supply, a compounding energy above about 150 units may be regarded as a high compounding energy which can affect the molecular structure and molecular weight distribution of the organopolysiloxane, for example by increasing the polydispersity of the organopolysiloxane. The polydispersity is defined as the weight average molecular weight Mw divided by the number average molecular weight Mn. For a twin screw extruder operating at a 380 volt power supply, a compounding energy above about 250 units will generally have a substantial effect on the molecular structure and molecular weight distribution of the organopolysiloxane.

Step (II) of the process of the invention, in which the masterbatch is mixed with further thermoplastic organic polymer to form a polymer composition having a lower concentration of organopolysiloxane than that in the masterbatch, does not need to use a particularly high compounding energy. The high compounding energy used in step (I) of the process of the invention gives a very fine, homogeneous dispersion of the organopolysiloxane phase in the thermoplastic organic polymer so that mixing with further thermoplastic organic polymer in step (II) essentially comprises mixing the thermoplastic organic polymer with itself or with a compatible thermoplastic organic polymer. The masterbatch can be sold to customers without requiring the customers to carry out highly intensive mixing techniques.

Another object of the invention relates to the polymer compositions obtained/directly obtained by the process of the invention.

Compositions produced according to the invention, comprising thermoplastic organic polymer containing organopolysiloxane, can be employed in a variety of applications. Polyolefin and polyester compositions can be extruded as films which are used for example as packaging materials, or can be extruded as fibres which can be made into woven and nonwoven textiles. The organopolysiloxane imparts low friction surface properties which facilitate film and fibre extrusion. Polyamine and polyamide compositions can be used in applications that require water and oil repellency and high temperature resistance, all of which properties are enhanced by the organopolysiloxane. Polypropylene is one of main materials used for interior automobile parts. Polypropylene compositions produced according to the invention can be moulded into automobile parts in which the organopolysiloxane imparts improved scratch and wear resistance. Compositions according to the invention can also be used in other applications such as wires and cables manufacturing. Compositions according to the invention can be used in the manufacture of films, fibres or moulded structures, for example interior automobile parts.

The invention relates to a process for the production of a polymer composition comprising an organopolysiloxane dispersed in a thermoplastic organic polymer, Such thermoplastic organic polymer is often liable to thermo-radical degradation or cross-linking when subjected to a high compounding energy at a temperature above its melting point. In a first step (I) the thermoplastic organic polymer and the organopolysiloxane are mixed at a temperature at which both the thermoplastic organic polymer and the organopolysiloxane are in liquid phases to form a masterbatch, and in a second step (II) the masterbatch is mixed with further thermoplastic organic polymer to form a polymer composition having a lower concentration of organopolysiloxane than that in the masterbatch. In the first step (I) the thermoplastic organic polymer and the organopolysiloxane are mixed in the presence of an additive capable of inhibiting the thermo-radical degradation or cross-linking of the thermoplastic organic polymer. The organopolysiloxane of the masterbatch remains stable during processing.

The invention extends to a masterbatch for the production of a polymer composition which composition comprises an organopolysiloxane dispersed in a thermoplastic organic polymer wherein the masterbatch is formed by mixing the thermoplastic organic polymer with an organopolysiloxane at a temperature at which both the thermoplastic organic polymer and the organopolysiloxane are in liquid phases, cooling the mixture to form a masterbatch in solid form, mixing the masterbatch with further thermoplastic organic polymer to form a polymer composition having a lower concentration of organopolysiloxane than that in the masterbatch, characterised in that the masterbatch comprises the thermoplastic organic polymer, the organopolysiloxane and an additive capable of inhibiting the thermo-radical degradation or cross-linking of the thermoplastic organic polymer.

The inventions extends to the use of an antioxidant to stabilise an organopolysiloxane of weight average molecular weight Mw in the range 10,000 to 1,000,000, preferably 100,000 to 1,000,000 during mixing in the molten state of the organopolysiloxane with a thermoplastic organic polymer liable to thermo-radical degradation or cross-linking when subjected to a high compounding energy at a temperature above its melting point.

The invention is illustrated by the following Examples, in which parts and percentages are by weight.

EXAMPLES 1 AND 2

Pellets of polypropylene homopolymer of melt flow Index (MFI) 12 (measured at 230° C./2.16 kg) were premixed with 0.5% pure Irganox 1010 antioxidant and introduced into a co-rotative twin screw extruder having a L/D (length/diameter) ratio of 48 and diameter of the screw 45 mm. The average screw temperature was between 200-230° C., which is over the melting temperature of polypropylene (165° C.). The polypropylene was melted in the first section of the extruder. A silicone gum was added into the already melted polypropylene phase in the extruder using a gear pump. The silicone gum was a substantially linear polydimethylsiloxane with vinyl functionalities of Mn 343600 and Mw 649900 (D.P. about 4650, MWD 1.89). The silicone gum was added at an equal weight to the polypropylene.

The twin screw extruder operated at 380 volts. Different screw speeds, motor amperage and feed rate of polymers were used in Examples 1 and 2 as shown in Table 1. Depending of the screw speed and the engine amperage, the residence time of the melt varied between 50 to 150 seconds.

The extrudate comprised a dispersion of the silicone gum in polypropylene matrix. The extrudate was cooled with water to room temperature and pelletized. The pellets were analyzed by X-ray photoelectron spectroscopy (XPS) to determine the silicone particle size distribution. Samples were extracted with xylene and analysed by gel permeation chromatography to determine the molecular weight information (Mn and Mw) and the polydispersity MWD was calculated. All data are compiled in Table 1.

In comparative examples C1 and C2, the polypropylene and the silicone gum were mixed and extruded in the same proportions and under substantially the same conditions as in Examples 1 and 2 respectively, but without the Irganox 1010 or any other additive. The results are shown in Table 1.

In comparative examples C1a and C2a, the polypropylene and the silicone gum were mixed and extruded in the same proportions and under the same conditions as in Examples 1 and 2 respectively, but with the Irganox 1010 being replaced by 1.5% of a concentrate of 25% of Cab-O-Sil (trade mark) silica treated with short silanol capped siloxane, which is a known additive for stabilising silicone gums, in the polypropylene homopolymer of MFI 12. The results are shown in Table 1.

TABLE 1

| Example | 1 | C1 | C1a | 2 | C2 | C2a |
|---|---|---|---|---|---|---|
| Screw speed rpm | 550 | 550 | 550 | 250 | 250 | 250 |
| Motor current amps | 45 | 45 | 45 | 85 | 85 | 85 |
| Feed rate Kg/hour | 50 | 50 | 50 | 80 | 100 | 80 |
| Irganox 1010 % | 0.5 | 0 | 0 | 0.5 | 0 | 0 |
| Silica concentrate % | 0 | 0 | 1.5 | 0 | 0 | 1.5 |
| Mn | 379200 | 476400 | 550700 | 375300 | 364600 | 388600 |
| Mw | 728500 | 1436000 | 1518000 | 666300 | 706500 | 747100 |
| MWD | 1.92 | 3.01 | 2.76 | 1.78 | 1.95 | 1.92 |
| Silicone particle size μm | 3 | 30 | 30 | 1 | 1 | 3 |

A comparison of Example 1 with comparative examples C1 and C1a shows that the molecular weight of silicone gum melt blended with polypropylene under the conditions of Example 1 without any stabilizer (C1) increases substantially, as does the polydispersity MWD. The molecular weight and polydispersity of silicone gum melt blended with polypropylene in the presence of the silica-based stabiliser known for polysiloxanes (C1a) increases by about the same proportion as the blend made without any stabilizer, but the molecular weight of the silicone gum melt blended in the presence of Irganox 1010 increases only slightly, indicating that the Irganox 1010 antioxidant works as a silicone stabilizer in this process while the silica-based stabiliser has no effect. Furthermore, the silicone particle size of the silicone dispersion in polypropylene in Example 1 is much lower than that of the silicone dispersions of comparative examples C1 and C1a, indicating that the stabilisation of the molecular weight of the silicone gum allowed formation of a finer dispersion.

A comparison of Example 2 with comparative examples C2 and C2a shows that under the conditions of Example 2 the molecular weight of silicone gum melt blended with polypropylene without any stabilizer (C2) increases slightly. The molecular weight of silicone gum melt blended with polypropylene in the presence of the silica-based stabiliser known for polysiloxanes (C2a) increases by about the same proportion as the blend made without any stabilizer, but the molecular weight of the silicone gum melt blended in the presence of Irganox 1010 antioxidant shows no significant increase.

The invention claimed is:

1. A process for the production of a polymer composition comprising an organopolysiloxane dispersed in a thermoplastic organic polymer, wherein:
   (I) thermoplastic organic polymer and organopolysiloxane are mixed under shear at a temperature at which both the thermoplastic organic polymer and the organopolysiloxane are in liquid phases and wherein the mixture is cooled to form a masterbatch in solid form containing a dispersion of the organopolysiloxane in a matrix of thermoplastic organic polymer; and
   (II) the solid masterbatch is mixed with further thermoplastic organic polymer to form a polymer composition having a lower concentration of organopolysiloxane than that in the solid masterbatch;
   wherein in (I) the thermoplastic organic polymer and the organopolysiloxane are mixed under shear at a ratio of 10 to 50 parts by weight of organopolysiloxane to 90 to 50 parts by weight of thermoplastic organic polymer and in the presence of an additive capable of inhibiting the thermo-radical degradation or cross-linking of the thermoplastic organic polymer.

2. The process according to claim 1, wherein the additive is an antioxidant.

3. The process according to claim 1, wherein the additive is a sterically hindered phenolic antioxidant.

4. The process according to claim 1, wherein the additive is present at 0.1% to 2% by weight based on the combined weight of thermoplastic organic polymer and organopolysiloxane in the masterbatch.

5. The process according to claim 1, wherein the organopolysiloxane is a predominantly linear siloxane polymer having a degree of polymerization greater than 4000.

6. The process according to claim 1, wherein the thermoplastic organic polymer is a polyolefin.

7. The process according to claim 6, wherein the polyolefin is polypropylene.

8. The process according to claim 7, wherein the polypropylene has a melt flow index below 20.

9. The process according to claim 1, wherein (I) comprises the steps of:
   (I)(a) first melting the thermoplastic organic polymer in the presence of the additive; and
   (I)(b) mixing the molten thermoplastic organic polymer produced in (I)(a) with the organopolysiloxane under shear.

10. The process according to claim 1, wherein the thermoplastic organic polymer and organopolysiloxane are mixed under shear in a twin screw extruder at a temperature in the range 180° C. to 250° C. to form an extrudate.

11. The process according to claim 10, wherein the extrudate is cooled and divided into pellets.

12. A masterbatch for the production of a polymer composition formed by the process according to claim 1, wherein the masterbatch comprises the thermoplastic organic polymer, the organopolysiloxane and the additive.

13. The process according to claim 1, wherein the additive is pentaerythritoltetrakis(3-(3,5-di-tert-butyl-4-hydroxyphenyl)propionate.

14. The process according to claim 1, wherein an average domain size of the organopolysiloxane phase dispersed in the polymer composition is from 1-10 μm.

15. A process for the production of a polymer composition comprising 10 to 50 parts by weight of an organopolysiloxane dispersed in 90 to 50 parts by weight of a thermoplastic organic polymer, wherein the thermoplastic organic polymer and the organopolysiloxane are mixed under shear at a temperature at which both the thermoplastic organic polymer and the organopolysiloxane are in liquid phases, wherein the thermoplastic organic polymer and the organopolysiloxane are mixed under shear in the presence of an additive capable of inhibiting the thermo-radical degradation or cross-linking of the thermoplastic organic polymer and the mixture is cooled to form a solid masterbatch containing a dispersion of the organopolysiloxane in a matrix of thermoplastic organic polymer, and wherein the solid masterbatch is mixed with further thermoplastic organic polymer to form the polymer composition having a lower concentration of organopolysiloxane than in the masterbatch.

16. The process according to claim 15, wherein an average domain size of the organopolysiloxane phase dispersed in the polymer composition is from 1-10 μm.

17. The process according to claim 15, wherein the additive is a sterically hindered phenolic antioxidant, alternatively wherein the additive is pentaerythritoltetrakis(3-(3, 5-di-tert-butyl-4-hydroxyphenyl)propionate.

18. A process for stabilising an organopolysiloxane during mixing of the organopolysiloxane with a thermoplastic organic polymer, said mixing being at a temperature above the melting point of the thermoplastic organic polymer, wherein the organopolysiloxane and the thermoplastic organic polymer are mixed under shear at a ratio of 10 to 50 parts by weight of organopolysiloxane to 90 to 50 parts by weight of thermoplastic organic polymer and in the presence of an additive capable of inhibiting the thermo-radical degradation or cross-linking of the thermoplastic organic polymer and the mixture is cooled to form a solid masterbatch containing a dispersion of the organopolysiloxane in a matrix of thermoplastic organic polymer, and wherein the solid masterbatch is mixed with further thermoplastic organic polymer to form the polymer composition having a lower concentration of organopolysiloxane than in the masterbatch.

19. The process according to claim 18, wherein the additive is a sterically hindered phenolic antioxidant, alternatively wherein the additive is pentaerythritoltetrakis(3-(3, 5-di-tert-butyl-4-hydroxyphenyl)propionate.

* * * * *